United States Patent [19]

Clarinval et al.

[11] 4,172,554
[45] Oct. 30, 1979

[54] APPARATUS FOR STORING AND READING DATA

[75] Inventors: Joseph Clarinval, Rotkreuz; Rolf Schmidhauser, Cham, both of Switzerland

[73] Assignee: LGZ Landis & Gyr Zug AG, Zug, Switzerland

[21] Appl. No.: 913,222

[22] Filed: Jun. 6, 1978

[30] Foreign Application Priority Data

Jun. 21, 1977 [CH] Switzerland ............... 7558/77

[51] Int. Cl.² ............... G06K 7/14; G06K 19/06; G06K 19/08; G08C 9/06
[52] U.S. Cl. ............... 235/466; 235/465; 235/494; 250/555
[58] Field of Search ............... 235/466, 465, 462, 474, 235/454; 250/555, 566, 568

[56] References Cited

U.S. PATENT DOCUMENTS

| | | | |
|---|---|---|---|
| 2,952,008 | 9/1960 | Mitchell et al. | 235/474 |
| 3,418,456 | 12/1966 | Hamisch et al. | 235/466 |
| 3,562,494 | 2/1971 | Schmidt | 235/466 |
| 3,798,421 | 3/1974 | Gilberg et al. | 235/465 |
| 3,852,572 | 12/1974 | Nicoud | 235/466 |
| 3,891,829 | 6/1975 | Dobras | 235/466 |
| 3,898,689 | 8/1975 | D'Orazio et al. | 235/466 |

*Primary Examiner*—Daryl W. Cook
*Attorney, Agent, or Firm*—Morgan, Finnegan, Pine, Foley & Lee

[57] ABSTRACT

Apparatus for storing and reading data in association with a card which has a timing track comprising at least three different kinds of optically-readable timing markings arranged in the timing track in a cyclic sequence, and a data track, the apparatus including three optical timing sensors respectively responsive to the three different kinds of timing markings, and a reading direction detector controlled by the timing sensors.

8 Claims, 5 Drawing Figures

APPARATUS FOR STORING AND READING DATA

BACKGROUND OF THE INVENTION

1. Field of the Invention

This invention relates to apparatus for storing and reading out data.

2. Description of the Prior Art

Reading apparatus for card-like information carriers are known, which require relative movement between the information carrier and a reading head of the reading apparatus. For example, the information carrier is moved past a stationary reading head, in a guide path of the reading apparatus. The reading head then reads out the coded data which is recorded in one or more data tracks of the information carrier. In many cases, a constant relative speed as between the information carrier and the reading head is required, and this involves substantial technical complexity.

It is known that the requirements for a constant reading speed may be circumvented by arranging a timing track with timing markings on the information carrier. The timing markings are also scanned in the reading apparatus, so marking the respective place, and thus the moment, at which a data bit of the data track is to be read out by the reading head. This makes it possible for the information carrier to be transported manually at any desired speed, when reading out the data. However, by reversing the direction of movement of the information carrier during the reading operation, it is possible to simulate other data, different from the actual data recorded on the data track. This can be prevented if the direction of reading, that is to say, the direction of movement of the information carrier, is detected in the reading apparatus.

A known reading apparatus for identity cards with four data tracks, a parity monitoring track and a timing track, includes a reading head for the timing track, which is displaced relative to the reading heads for the other tracks by such a distance that its reading-out range overlaps with the reading-out ranges of the other heads. A reading direction detector monitors the direction of transportation movement of the card, by means of the signals of all the reading heads, and produces an error signal if the direction of transportation movement is incorrect.

SUMMARY OF THE INVENTION

One object of the present invention is to provide improved apparatus of the kind set out above.

Another object of the present invention is to provide apparatus which permits reliable detection of the reading direction solely by reference to timing markings.

Another object of the present invention is to provide apparatus for reading stored data, the direction of reading being determined by reference to a timing track comprising at least three different kinds of timing markings arranged in a cyclic sequence.

According to the present invention there is provided apparatus for storing and reading out data in association with a card-like information carrier which has a timing track comprising at least three different kinds of timing markings which can be read optically, arranged in said timing track in a cyclic sequence, and at least one data track including coded data, the apparatus comprising means for serially scanning the timing markings and for reading out the coded data, and a reading direction detector, said scanning means including at least three optical timing sensors which are each responsive to respective ones of said different kinds of timing markings, which timing sensors are connected to said reading direction detector, whereby the feed direction of said sequence of the timing signals produced by the timing sensors can be determined by said reading direction detector.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
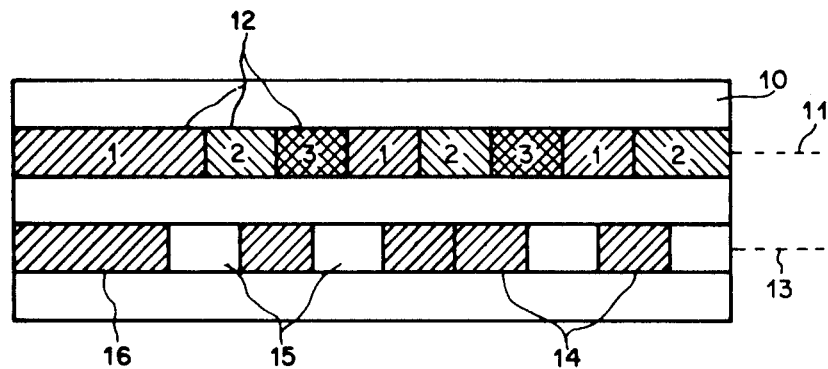
FIG. 1 shows an information carrier.

In FIG. 1, reference numeral 10 denotes a card-like information carrier which may be an identity card, an admission card, a credit card, a paper representing value, a check, a travel ticket, a data card, a perforated card, or the like. The information carrier 10 has a timing track 11 with timing markings 12 which can be optically read by machine, and at least one data track 13 which is parallel to the timing track 11 and which includes a piece of coded data. The timing markings 12 comprise three different kinds 1, 2 and 3 of timing markings 12 which are indicated in the drawing by different hatchings and which are arranged on the timing track, as viewed from left to right in the drawing, in the cyclic sequence 123123 . . . . In the embodiment illustrated, the timing markings 12 are arranged in a row without any gaps therebetween. They are distinguished from the surface of the information carrier 10, which surface is free of markings, by a characteristic reflection, transmission, beam diffraction or beam refraction, which can be detected in the reading apparatus, and can accordingly be colored areas, holes of characteristic shape, diffraction gratings, holograms, kinoforms, fresnel lenses, relief structures, or the like.

For recording the coded data on the data track 13, known storage methods can be used—for example, optical or magnetic methods. In the embodiment illustrated, the data track 13 also includes markings 14 which can be optically read by machine, and marking-free areas 15, a marking 14 representing, for example, a binary "1" and a marking-free area 15 representing a binary "0". The timing markings 12 are laterally displaced relative to the markings 14 and the areas 15 of the data track 13 in such a way that each transition from a timing marking 12 to the next timing marking 12 coincides with the center line of a marking 14 or of a marking-free area 15, and thereby establishes in the reading apparatus the instant for reading out the next data bit.

Such a lateral displacement is obviously not necessary if, instead, the timing and data sensors in the reading apparatus are suitably offset laterally. At its beginning, the data track 13 carries a reference marking 16, the purpose of which is set out below.

Figure 2:
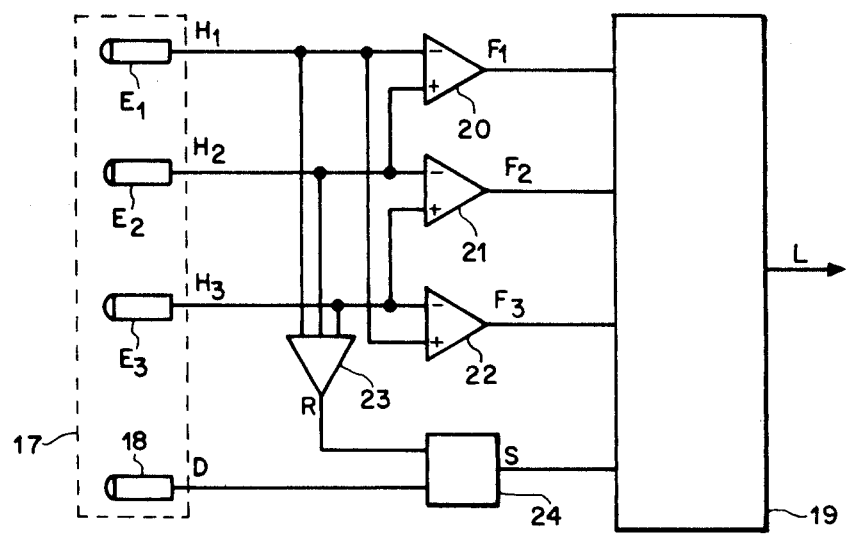
FIG. 2 shows a circuit illustrating the principle of a reading apparatus.

The reading apparatus shown in FIG. 2 has a combined reading head 17 for the timing track 11 and data track 13, which head comprises one or more light sources (not shown), three optical timing sensors $E_1$, $E_2$ and $E_3$, and one or more data sensors 18. The timing sensor $E_1$ is so constructed that the electrical signal $H_1$ at its output assumes a high value when the reading head 17 is opposite a timing marking 12 of kind 1. If, however, a timing marking 12 of kind 2 or 3 is opposite the reading head 17, the signal $H_1$ is virtually zero. In the same manner, the timing sensor $E_2$ or $E_3$ responds to timing markings 12 of kind 2 or 3 respectively, and produces an electrical signal $H_2$ or $H_3$ respectively. Depending on the nature of the timing markings 12, it is possible to ensure—for example, by using filters or masks or by arranging the timing sensors $E_1$ to $E_3$ in different angular positions—that each of the timing sensors responds selectively to the timing marking 12 of kind 1, 2 or 3 which is associated therewith. Each timing sensor $E_1$ to $E_3$ may comprise a single light receiver or a plurality of light receivers connected to a detection logic means.

The timing sensors $E_1$ to $E_3$ are connected to a reading direction detector which, when the timing markings 12 are scanned in serial manner, establishes the feed direction of the sequence of timing signals produced by the timing sensors $E_1$ to $E_3$. In the embodiment illustrated, the reading direction detector is formed by a micro-processor 19 which also processes and evaluates the data signal D produced by the data sensor 18. In the embodiment illustrated, the timing sensors $E_1$ to $E_3$ are connected by way of three comparators 20 to 22 to the reading direction detector which is formed by the micro-processor 19. The inputs of the comparator 20 are connected to the timing sensors $E_1$ and $E_2$, the inputs of the comparator 21 are connected to the timing sensors $E_2$ and $E_3$, and the inputs of the comparator 22 are connected to the timing sensors $E_3$ and $E_1$. The output signals of the comparators 20 to 22 are denoted by reference $F_1$ to $F_3$ in FIG. 2.

The timing sensors $E_1$ to $E_3$ are also connected to a summing means 23 for forming a reference signal R. A comparison means 24 which produces an output signal S is connected at its input side to the summing means 23 and to the data sensor 18 and at its output side to the micro-processor 19. For serially reading out the coded data stored on the information carrier 10, the information carrier 10 is introduced into a slot (not shown) in the reading apparatus and moved past the reading head 17. If the information carrier is moved in the opposite direction to the prescribed direction of transportation movement, the reading direction detector formed by the micro-processor 19 supplies a reading direction signal L which blocks evaluation of the data read or which is taken into account in evaluation of the data, for example by reversing the bit sequence.

Figure 3:
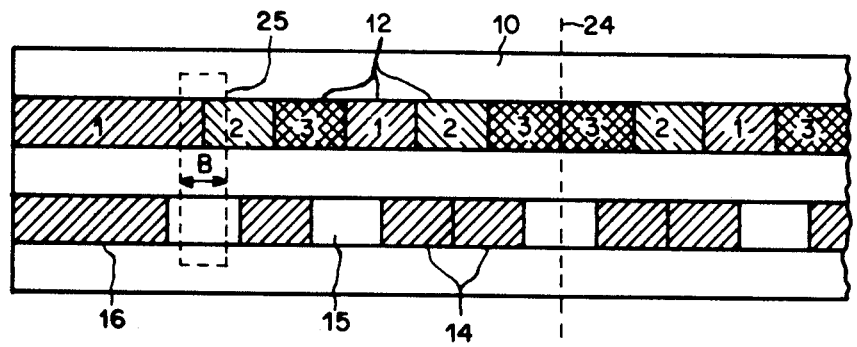
FIG. 3 shows the configuration of the information carrier of FIG. 1, along with its mirror image.
Figure 4:
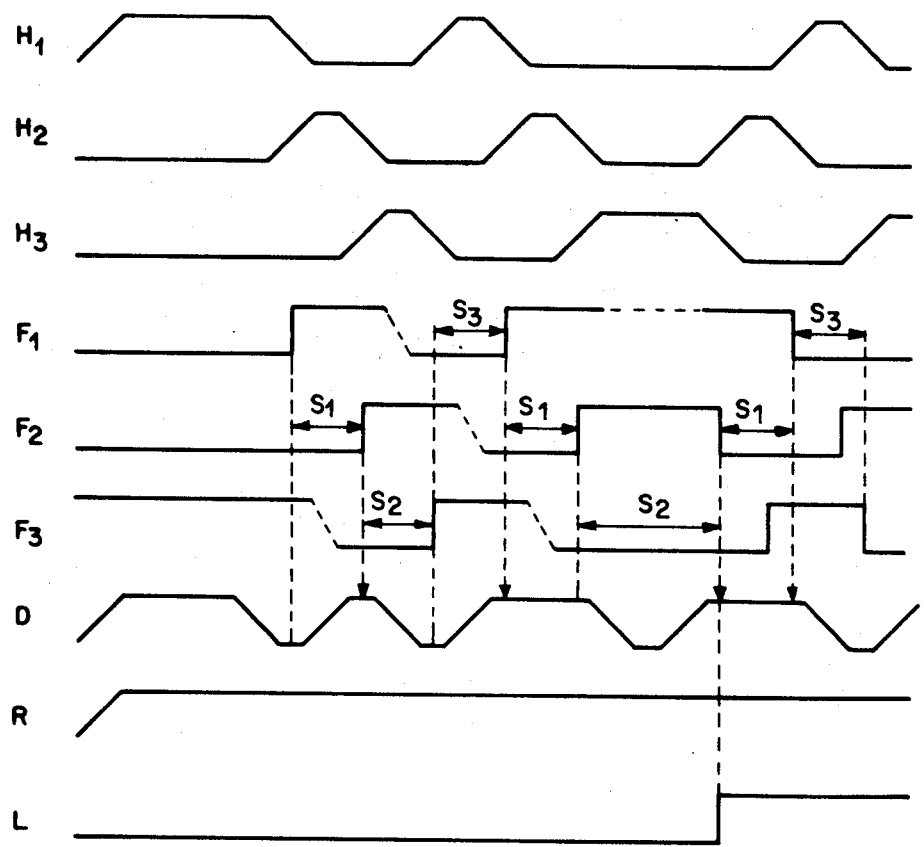
FIG. 4 shows a signal diagram.
Figure 5:
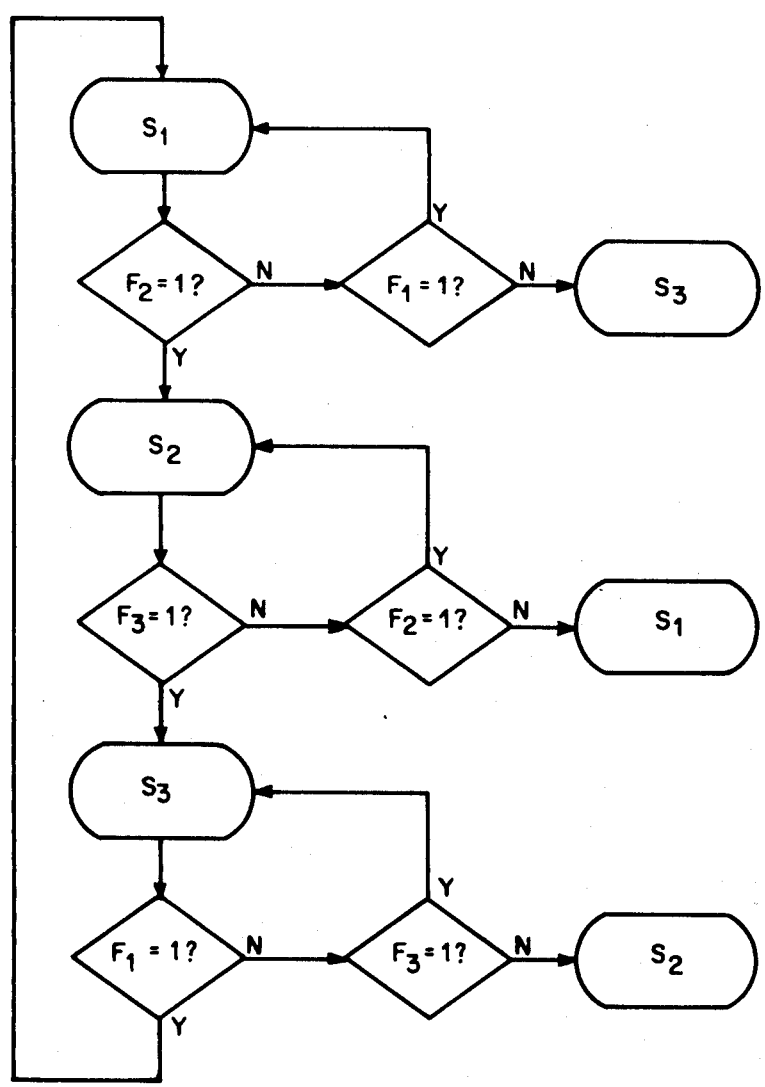
FIG. 5 shows a flow diagram.

Reference is now made to FIGS. 3 to 5 to describe in detail the mode of operation of the reading apparatus, showing the production of the reading direction signal L when the information carrier 10 is at the beginning moved in the right direction but thereafter is moved in the opposite direction of transportation.

In order to represent a reversal of the direction of transportation, a part of the information carrier 10 is shown in the original manner in FIG. 3 on the left-hand side of a straight line 24, and is shown in mirror image on the right-hand side of the straight line 24. A dashed line rectangle 25 denotes the region of the information carrier 10 which is encompassed at a given moment of consideration by the reading head 17 (FIG. 2). It is assumed that the rectangle 25 moves from left to right in the drawing, and passes across the straight line 24, which is equivalent to a reversal of the direction of transportation movement. FIG. 4 shows the form of the electrical signals $H_1$ to $H_3$, $F_1$ to $F_3$, D, R and L, which are then produced in the reading apparatus.

When the reading head 17 passes over a timing marking 12 of kind 1, the signal $H_1$ rises and thereafter falls again. The same applies for the signals $H_2$ and $H_3$, and in regard to the markings 14 for the data signal D. As a result of the finite width B of the rectangle, the leading and trailing edges of these signals are at a relatively shallow angle of inclination.

The output signal $F_1$ of the comparator 20 assumes the logic value 0, as long as $H_1 > H_2$, and jumps to logic value 1 when the reading head 17 moves from a timing marking 12 of kind 1 onto a timing marking 12 of kind 2. If the reading head 17 is exclusively in the region of a timing marking 12 of kind 3, and the signals $H_1$ and $H_2$ are accordingly small to the point of vanishing, the switching condition of the comparator 20, and thus also the signal $F_1$ are not defined, for which reason the signal $F_1$ is indicated in broken lines in this region in FIG. 4. The foregoing, relating to signal $F_1$, applies in a similar manner to signals $F_2$ and $F_3$.

On the basis of the signals $F_1$ to $F_3$, it is possible to distinguish three conditions $S_1$ to $S_3$, namely the condition $S_1$ when $F_1 = 1$ and $F_2 = 0$, the condition $S_2$ when $F_2 = 1$ and $F_3 = 0$, and finally the condition $S_3$ when $F_3 = 1$ and $F_1 = 0$. On each transition from one of the conditions $S_1$ to $S_3$ to the next condition $S_1$ to $S_3$, the respective next data is read out from the data signal D in the micro-processor 19.

When movement is in the correct direction of reading, these conditions change in the feed direction ... $S_1$, $S_2$, $S_3$, $S_1$ ..., while in the opposite direction to the correct direction of reading, these conditions change in the feed direction ... $S_1$, $S_3$, $S_2$, $S_1$ ....

The feed direction is checked in the micro-processor 19, in accordance with the flow diagram in FIG. 5, in which Y represents "yes" and N represents "no". To describe this flow diagram, it is assumed that the instantaneous condition is $S_1$ (at the top in the flow diagram), and the information carrier 10 is first transported in the correct direction. The periodic negation of the question $F_2 = 1$? and affirmation of the question $F_1 = 1$? leads back in each case in the flow diagram to the condition $S_1$, until the signal becomes $F_2 = 1$ and the condition becomes $S_2$. Affirmation of the question $F_3 = 1$? leads to the condition $S_3$, affirmation of the question $F_1 = 1$? leads back to the condition $S_1$, and so on.

A reversal of the direction of transportation movement of the information carrier 10, for example in the condition $S_2$, leads, after negation of the question $F_3 = 1$? to negation of the question $F_2 = 1$?, whereupon the fact that a return has been made to the condition $S_1$ is established and the reading direction signal L (FIG. 4) is altered.

Therefore, the direction of reading can be reliably established solely by reference to the timing markings 12, with the above-described arrangement, so that the reading direction detection operation does not involve any undesirable limitation of the coding possibilities on the data track or tracks. The above-described signal comparison operation, with the comparators 20 to 22, also makes it possible for digital signals $F_1$ to $F_3$ which can easily be further processed, to be produced even on a worn information carrier which supplies only weak analog signals $H_1$ to $H_3$.

The signals $H_1$ to $H_3$ produced by the timing sensors $E_1$ to $E_3$ also include, besides the timing information, intensity information which can be evaluated in an excellent manner for the error-free reading-out of the coded data stored in the data track 13. The sensitivity of the timing sensors $E_1$ to $E_3$ can easily be adjusted to each other in such a way that the reference signal R at the output of the summing means 23 is virtually constant over the length of the timing track 11 (FIG. 4). By comparing the data signal D with the reference signal R in the comparison means 24 (FIG. 2), an output signal S can be formed, which is substantially independent of temperature and voltage fluctuations and of wear of the information carrier 10, as effects of this kind influence the data signal D and the reference signal S in the same manner, and are thus compensated. Particularly good compensation can be achieved by forming the quotient of the data signal D and the reference signal R, with the comparison means 24.

The output signal S of the comparison means 24 is advantageously compared to a first and a second reference value which is stored in a storage means of the micro-processor 19, with a further comparison means (not shown). One of these two reference values is preferably determined at the beginning of the reading operation at the reference marking 16 and the other reference value is determined at the first of the marking-free areas 15 of the data track (FIG. 1), and stored in the said storage means of the micro-processor 19. In addition, the output signal S which is produced on sensing of the reference marking 16 or the first area 15 at the comparison means 24 can be stored in the storage means, as a first or second reference value respectively.

The influence of temperature and voltage fluctuations and wear of the information carrier 10 can be still further reduced by comparing the output signal S of the comparison means 24 to the two reference values determined from the information carrier 10. In addition, aging and other influences of the optical and electronic components of the reading apparatus are substantially compensated by these measures. The above-described measures thus ensure reliable read-out of the coded data.

As already mentioned, the timing markings 12 can be diffraction gratings, holograms, kinoforms, fresnel lenses, or the like. The manufacture of such optical components requires high investment and good technical knowledge, so that the proposed arrangement of timing markings of different kinds can also ensure a high degree of protection from forgeries.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. Apparatus for storing and reading out data in association with a card-like information carrier which has a timing track comprising at least three different kinds of timing markings which can be read optically, arranged in said timing track in a cyclic sequence, and at least one data track including coded data, the apparatus comprising means for serially scanning the timing markings and for reading out the coded data, and a reading direction detector, said scanning means including at least three optical timing sensors which are each responsive to respective ones of said different kinds of timing markings, which timing sensors are connected to said reading direction detector, whereby the feed direction of said sequence of the timing signals produced by the timing sensors can be determined by said reading direction detector.

2. Apparatus according to claim 1 further comprising three signal comparators each having two inputs and an output and wherein each said timing sensor is connected to one input of two said signal comparators respectively, and the outputs of said comparators are connected to said reading direction detector.

3. Apparatus according to claim 1 wherein said reading direction detector is a micro-processor.

4. Apparatus according to claim 1 wherein said timing markings are arranged in a row without gaps in said timing track, and said apparatus comprises a summing means, at least one data sensor for serial reading-out of the coded data, and a comparison means, said timing sensors being connected to said summing means to form a reference signal, and said summing means and said data sensor being connected to said comparison means.

5. Apparatus according to claim 4 comprising a storage means storing a first and second reference value, and at least one further comparison means for comparing the output signal of said first-mentioned comparison means with said first and second reference value stored in said storage means.

6. Apparatus according to claim 5 wherein said first and second reference values can be determined at a first reference surface and a second reference surface respectively of said data track, and can be stored in the storage means.

7. Apparatus according to claim 6 wherein said output signal which is produced at said first-mentioned comparison means when said first reference surface or said second reference surface is scanned can be stored in said storage means as said first or second reference value respectively.

8. Apparatus according to claim 1 wherein said timing markings are at least one of refraction gratings, holograms, kinoforms, and fresnel lenses, which deflect an incident light beam into predetermined characteristic directions.

* * * * *